July 21, 1959  L. HIRSCH  2,895,216

DISENGAGING DEVICE FOR GLASS-HOLDING STRIPS

Filed Jan. 31, 1955

INVENTOR.
LEOPOLD HIRSCH.
BY
*Robert A. Sloman*
ATTORNEY.

United States Patent Office 2,895,216
Patented July 21, 1959

2,895,216

DISENGAGING DEVICE FOR GLASS-HOLDING STRIPS

Leopold Hirsch, Oak Park, Mich.

Application January 31, 1955, Serial No. 485,032

1 Claim. (Cl. 29—256)

This invention relates to a disengaging device for glass holding strips, and more particularly to a glass removing and inserting tool such as might be used for engaging or disengaging a strip of glass such as a vehicle ventilator glass from its U-shaped molding or inserting the same therein.

It is the primary object of the present invention to provide a simplified glass gripping device, together with means for retainingly engaging a portion of the glass holding strip whereby pressure can be transmitted to the said glass engaging elements at the same time anchoring the strip against longitudinal displacement so that the glass may be withdrawn therefrom.

It is the further object of the present invention to provide in a device of this type means for gripping the glass and at the same time operatively engaging the molding therefor whereby the same may be projected over the marginal edges of the glass.

It is the further object of the present invention to provide an improved and more efficient glass gripping mechanism than heretofore obtained and which is effective for engaging or disengaging the glass from a channeled supporting strip.

It is the further object of the present invention to provide a novel mounting for at least one of the glass gripping pads forming a part of the present device whereby the same is self-aligning with the surface of the glass.

Figure 1:
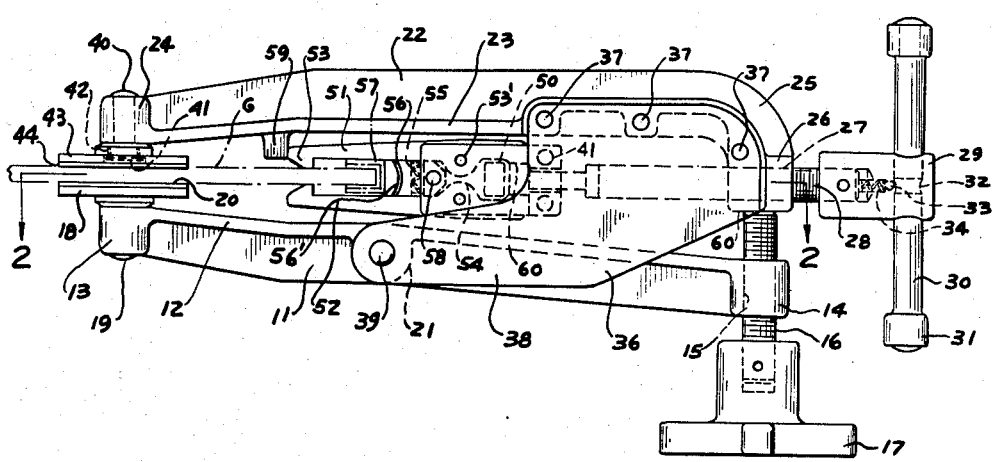
Figure 2:
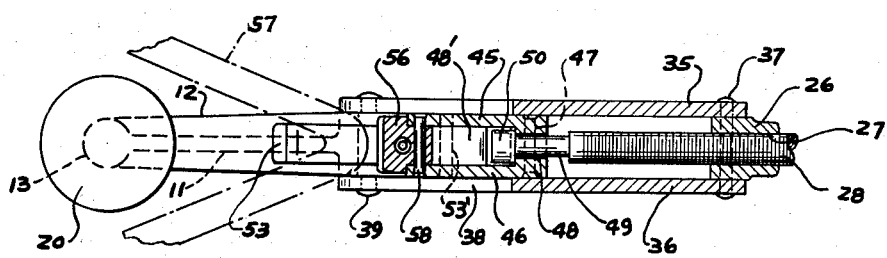

These and other objects will be seen from the following specification and claim in conjunction with the appended drawing, in which:

Fig. 1 is a side elevational view of the present engaging or disengaging device for a glass holding strip; and Fig. 2 is a fragmentary section taken on line 2—2 of Fig. 1.

It will be understood that the above drawing illustrates merely a preferred embodiment of the invention and that other embodiments are contemplated within the scope of the claim hereafter set forth.

Referring to the drawing, the present tool includes elongated clamp arm 11 which is arranged in an upright position normally and which has along its upper edge the laterally extending reinforcing webbing 12, said arm terminating at its opposite ends in the upright bosses 13 and 14, boss 14 having an upright interiorly threaded aperture 15 formed therethrough.

Boss 14 receives the threaded shaft 16 which has secured thereto at its outer end the hand knob 17, the free end of the shaft 16 being adapted to operatively engage transversely arranged boss 26 forming a part of frame 25, hereafter described.

Circular pressure pad 18 is secured by rivet 19 to clamp arm 11 by the rivet 19 which extends through boss 13. A suitable composition is applied to the top surface of pressure pad 18 as at 20, said composition in a preferred embodiment being a layer of rubberized plastic adapted to effectively grip the glass plate G shown in phantom in Fig. 1. The rubberized plastic cover 20 is highly efficient in gripping the said glass and at the same time protects the same against marring.

The clamp arm 11 intermediate its ends has a transverse boss 21 which is centrally apertured therethrough and is adapted to receive the pivot pin 39 for the elongated frame 22.

Said frame is arranged in an upright position and terminates along its lower edge in the laterally projected reinforcing webbing 23, said frame having an upright boss 24 at one end vertically aligned with boss 13 and which is transversely apertured for receiving and securing therein rivet 40, hereafter described.

The opposite end of frame 22 is curved downwardly as at 25 and terminates in the above described transversely arranged boss 26 which has a flat undersurface 60 for cooperatively receiving the free end of locking shaft 16 in the manner hereafter described.

Boss 26 is transversely apertured and interiorly threaded as at 27 for cooperatively receiving the horizontally disposed jaw screw 28 which has secured thereto at its outer end the screw end fitting 29, and which is transversely apertured to slidably receive the elongated handle 30 with enlarged ends 31. Handle 30 intermediate its ends has an annular recess 32 formed therein adapted to cooperatively receive ball detent 33 carried within fitting 29 and biased into recess 32 by the coiled spring 34 also carried within fitting 29. By this construction the handle 30 will be retained in the central position shown in Fig. 1, but, nevertheless, to increase the mechanical advantage in turning the screw 28, said handle may be slid longitudinally of the said fitting.

The elongated frame 22 is pivotally mounted upon elongated arm 11 and arranged thereabove in opposed relation. For this purpose there are provided upon opposite sides of frame 22 at one end thereof a pair of depending side plates 35 and 36 which are secured to the said frame as by the series of transversely arranged rivets 37.

The side plates at their lower ends have forwardly projecting portions 38 whose free forward transversely apertured ends register with the clamp arm boss 21 and are pivotally mounted thereon by the transversely arranged pivot pin 39.

The shoulder rivet 40 extending through boss 24 of frame 22 depends below said boss and its shoulder 41 is loosely received within the oversized undercut opening 42 formed in pressure pad 43.

Pressure pad 43 is in vertical alignment and in opposing relation to pressure pad 18 and carries upon its under-surface a layer of rubberized plastic 44 adapted to grippingly and retainingly engage one surface of the glass plate G.

In view of the loose fitting between the shoulder rivet 40—41 and the said pressure pad 43, there is permitted a slight universal adjustment of the said pressure pad 43 with respect to the said glass whereby said pressure pad becomes self-aligning as it is applied to one surface of the said glass in cooperation with the opposing pressure pad 18.

A pair of elongated rectangularly shaped jaw holder plates 45 and 46 are arranged in an upright position between clamp arm 11 and frame 22 and are secured together by the rivets 47, said plates terminating at their one ends in a pair of opposed inwardly directed end walls to define aperture 48 which slidably receives the stem 49 upon the inner end of clamp screw 28, said stem carrying upon its outer end a cylindrical stop 50 of increased diameter and which is loosely nested within the chamber or recess 48', defined by the pair of elongated horizontally disposed jaws 51 and 52 which are arranged in opposed relation and whose one ends extend within and between plates 45 and 46.

Each of the said jaws terminate at their forward ends in the inwardly directed clamp elements 53 which are adapted to move over the outer surface of glass G and which are adapted to grippingly engage the opposed free marginal portions of the glass mounting strip 57 for operation in the manner hereafter described.

The said jaws 51 and 52 have central opposed inwardly directed curved portions 54 which are transversely apertured and receive the transversely pivot pins 53' which extend through said jaws and through corresponding apertures in plates 45 and 46 providing a pivotal mounting for said jaws.

Coiled spring 55 is interposed between the said jaws for normally urging the same apart at their clamping ends with respect to their pivotal mountings 53', there being an inwardly projecting stop 59 formed upon the interior surface of frame 22 for limiting the longitudinal movement of jaw 51 in one direction.

A fibre block 56 is positioned between forward portions of plates 45 and 46 and projects forwardly thereof, being secured to the said plates by the transverse rivet 58. Said block has a concave forward end 56' adapted for operative engagement with the outer edge portion of the channeled strip 57 for projecting the said strip over the marginal edge of the glass upon sufficient manual rotation in a clockwise direction of clamp screw 28, in cooperation with the retaining engagement of the pressure pads 18 and 43, in the manner more fully described hereafter. The said block is transversely apertured to receive the spring 55 for normally urging the clamping elements 53 of the said jaws 51 and 52 outwardly to prevent any defacement of the glass as the said jaws are projected thereover.

The end portions of the said jaws 51 and 52 terminate in the parallel spaced walls 60 which are of such distance apart as to be adapted to cooperatively receive the enlargement 50 upon the end of stem 49 when the said clamp screw is rotated in a counterclockwise direction, for illustration, such that the said enlargement is moved longitudinally between the said wall portions 60.

In operation, when it is desired to separate the glass from the channel element 57, the hand knob 17 and threaded shaft 16 are rotated so that the said shaft operatively engages boss 26. In view of the pivotal connection 39 between arm 11 and frame 22, this action of shaft 26 will cause the pressure pads 18 and 43 to move compressively towards each other and grippingly engage the glass G.

When the glass is fully gripped, the said handle 30, as well as the clamp screw 28, are rotated in such a fashion that the said screw is moved longitudinally outward. The enlargement 50 will engage portions of the jaws 51 and 52 sufficiently as to cause a rearward movement of said jaws and the plates 45 and 46 connected therewith until the clamp elements 53 engage the marginal edges of the U-shaped molding strip 57. Thereafter, upon further longitudinal movement of the said clamp screw, the enlargement 50 will move into the space defined between the opposed wall portions 60 of the said jaws and will engage the end portions of the plates 45 and 46 so that upon further longitudinal withdrawing movement of said clamp screw, the said plates 45 and 46 and the jaws 51 and 52 connected therewith will be forcefully moved rearwardly relatively to the pressure pads 18 and 43.

In this connection, while the enlargement 50 occupied the space 48' between the said jaws, the withdrawing movement was effected with the said clamp elements 53 of the jaws slightly displaced from the surface of the glass in view of the action of the coiled spring 55. However, as the enlargement 50 enters the space defined by the wall portion 60, the said jaws are projected at their clamping ends into engagement with the surface of the glass and are held in this position in view of the pivotal mountings 53 of the said jaws. The clamp elements 53' are thus maintained in operative engagement with the marginal portions of the U-shaped moldings 57.

Further, longitudinal outward movement of the clamping screw 28 with respect to the frame 22 will gradually effect a disengagement of the said molding from the glass.

It will be understood that in the operation of the present device the pressure pads 18 and 43 are grippingly retaining the said glass and the operation of the clamp screw 28 may in effect be laterally projecting the glass G outwardly of the channel element 57, because in normal operation the said channel may be rigidly supported upon some portion of a vehicle, and hence, immovable.

It actually makes no difference because there will be a relative separation between the glass and the channel element 57. Should the said channel be separated from the frame of the vehicle, operation of the device would be exactly the same with the glass moving relatively outwardly with respect to the channel 57, or the channel moving relatively outwardly with respect to the glass. In any event, continued rotation of the screw 28 will cause a disengaging of the glass from the channel.

For the reverse operation and wherein it is desirous of moving the glass back into a fixed channel element such as channel element 57, then the device is again set up so that the pressure pads grippingly engage the glass. Rotation of the screw 28 in the opposite direction will cause an inward movement of said clamp screw from a position shown in Fig. 1. In this connection, the enlargement 50 will be loosely engaging portions 54 of the jaws 51 and 52, or alternately, the end portion of screw 28 will be engaging the end walls of plates 45 and 46, as shown in Fig. 2. In either event, the said jaws will move forwardly loosely over the surface of the glass with the said spring 55 maintaining the jaws separated. Eventually, the block 56 operatively engages the channel element 57 and continued longitudinal movement of the screw 28 forcefully projects the said block against the outer edge of the channel. If the channel is stationary, then in that case the glass by action of the pressure pads is moved into the said channel to complete the assembly.

Having described my invention, reference should now be had to the claim which follows for determining the scope thereof.

I claim:

In a tool adapted for use in the replacement of a pane of glass which has the edges thereof retained in a channel frame, an elongated clamp arm, a transversely arranged pressure pad secured upon one end thereof, a transversely arranged clamp screw threaded through the opposite end thereof, an elongated frame arranged in opposed relation to said arm and pivotally connected intermediate its ends to an intermediate portion of said arm, a transversely arranged pressure pad secured upon one end of said frame in alignment with said first pressure pad and in opposed relation for gripping a pane therebetween, the opposite end of said frame being operatively engaged by said clamp screw for establishing a gripping relation between said pads, an elongated jaw screw threaded through said latter end of said frame interposed between the frame and arm longitudinally thereof, and a pair of opposed pivotal channel frame engaging jaws swivelly secured upon the end of said jaw screw, the mounting of said jaws comprising a horizontally extending U-shaped housing with an apertured base, said jaw screw having a portion of reduced diameter slidably extending loosely through said base defining a pair of spaced annular shoulders alternately engageable with said base for pulling and pushing said housing, said jaws being pivotally mounted within and upon said housing and projecting outwardly thereof, the inner ends of said jaws within said housing having inwardly directed opposing portions to cooperatively receive the shoulder on the end of said jaw screw for pivoting the free ends of said jaws toward each other and for securing said jaws in gripping relation to the edge of said channel frame.

References Cited in the file of this patent

UNITED STATES PATENTS

| | | | |
|---|---|---|---|
| 37,332 | Chapman | Jan. 6, | 1863 |
| 324,673 | Ehrenfeld | Aug. 18, | 1885 |
| 1,554,468 | Tague | Sept. 22, | 1925 |
| 1,570,338 | Davis | Jan. 19, | 1926 |
| 1,778,802 | Hurwell | Oct. 21, | 1930 |
| 1,955,630 | Hall | Apr. 17, | 1934 |
| 2,022,549 | Shelton | Nov. 26, | 1935 |
| 2,028,610 | Jacoel | Jan. 21, | 1936 |
| 2,039,371 | White et al. | May 5, | 1936 |
| 2,772,473 | Pfann | Dec. 4, | 1956 |
| 2,825,127 | Armstrong | Mar. 4, | 1958 |